H. D. HOVIS.
ATTACHMENT FOR HORSESHOES.
APPLICATION FILED JUNE 1, 1908.
898,895.
Patented Sept. 15, 1908.
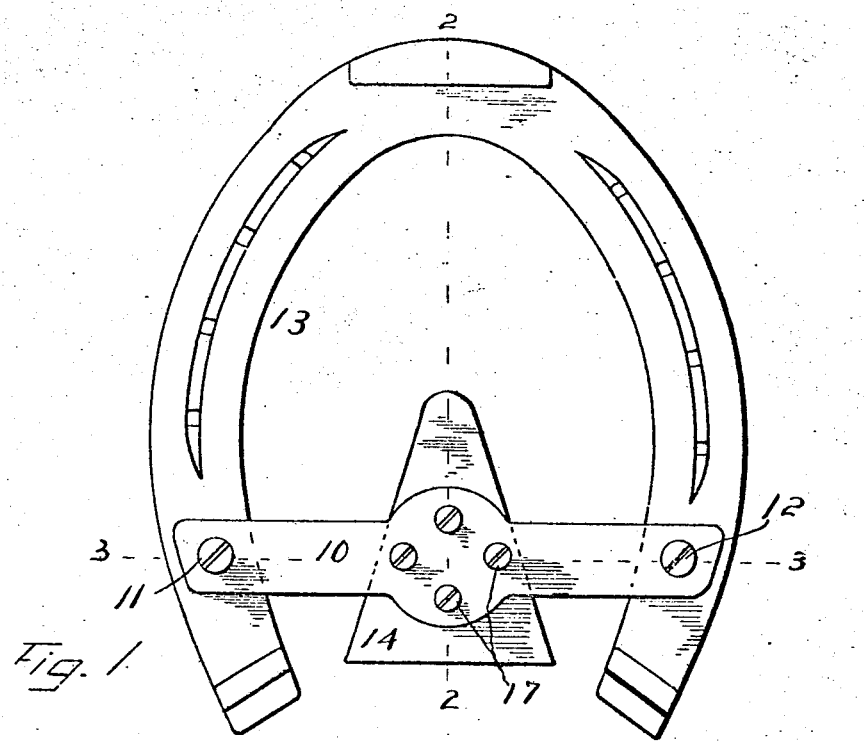
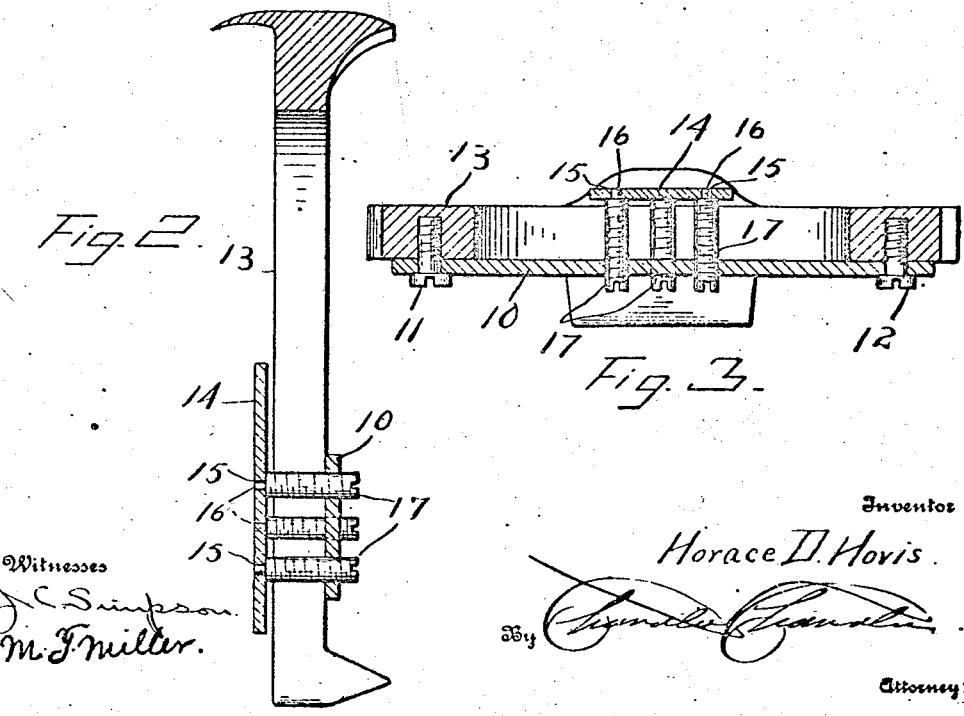
Witnesses
J. C. Simpson
M. F. Miller
Inventor
Horace D. Hovis.
By
Attorneys

UNITED STATES PATENT OFFICE.

HORACE D. HOVIS, OF WATERFORD, PENNSYLVANIA.

ATTACHMENT FOR HORSESHOES.

No. 898,895.  Specification of Letters Patent.  Patented Sept. 15, 1908.

Application filed June 1, 1908. Serial No. 436,085.

*To all whom it may concern:*

Be it known that I, HORACE D. HOVIS, a citizen of the United States, residing at Waterford, in the county of Erie, State of Pennsylvania, have invented certain new and useful Improvements in Attachments for Horseshoes; and I do hereby declare the following to be a full, clear, and exact description of the invention, such as will enable others skilled in the art to which it appertains to make and use the same.

This invention relates to horseshoes and has for one of its objects to provide a simply constructed attachment to a horseshoe especially adapted to the feet of horses affected with contracted heels, pumice feet, flat feet, quarter crack or other soreness of the heels, lameness of the navicular joints and kindred troubles.

Another object of the invention is to provide an attachment for a horseshoe which removes the pressure of the shoe from the heel portion of the hoof and applies it to the frog portion.

With these and other objects in view the invention consists in a bar adapted to be attached to a horseshoe and formed with its intermediate portion increased in width and provided with spaced threaded apertures; a plate for bearing beneath the frog portion of the foot, and adjusting screws operating through said threaded apertures and engaging the plate, whereby the plate may be adapted to the form and location of the frog relative to the shoe.

The invention further consists in certain other novel features of construction as hereafter shown and described and specifically pointed out in the claims, and in the drawings illustrative of the preferred embodiment of the invention, Figure 1 is a bottom plan view of a horseshoe with the improvement applied. Fig. 2 is a section on the line 2—2 of Fig. 1. Fig. 3 is a section of the line 3—3 of Fig. 1.

The improved device comprises a bar 10 having apertures at the ends to receive the fastening means, preferably screws 11—12 whereby the bar may be connected transversely of the shoe 13, near the heel portions, the bar being wider at the center as shown and provided with a plurality of spaced threaded apertures.

A plate 14 is provided and formed with diverging sides and disposed above the bar 10 and adapted to bear against the frog portion of the foot and provided with a plurality of sockets 15 corresponding to the apertures in the bar to receive the reduced ends 16 of screws 17 which engage the threaded apertures of the bar. By this means the plate is adjustably supported from the bar, and adapted to any variations in the frog. By this simple arrangement the frog plate may be adjusted to fit any irregularities of the surface of the frog by simply actuating the adjusting screws, so that the plate bears uniformly upon also surfaces of the frog, and thus prevents unequal pressure, or strains thereon.

The improved device may be applied to shoes of all sizes, and readily adapted to different shapes of shoes. The form of the plate with the sides diverging toward the heel portion is an important feature, as the wider portion of the plate is thereby disposed where the greatest strains occur, and the strains thus distributed over a greater area of the foot.

What is claimed, is:—

1. An attachment for horseshoes comprising a bar adapted to be attached to the shoe and extended laterally intermediate the ends and with a plurality of spaced threaded apertures in the extended portion, a plate adapted to bear beneath the frog portion of the hoof of the horse, and a plurality of screws operating through said threaded apertures and bearing beneath said plate and providing means for adjustably connecting said plate to said bar.

2. An attachment for horseshoes comprising a bar adapted to be attached to the shoe and extended laterally intermediate the ends and with a plurality of spaced threaded apertures in the extended portion, a plate adapted to bear beneath the frog portion of the hoof of the horse and with the sides diverging toward the heel, and a plurality of screws operating through said threaded apertures and bearing beneath the plate and providing means for adjustably connecting said plate to said bar.

3. An attachment for horseshoes comprising a bar adapted to be attached to the shoe and extended laterally intermediate its ends and with spaced threaded apertures in the extended portion, a plate adapted to bear beneath the frog portion of the hoof of the horse and provided with sockets corresponding to the threaded apertures of the bar, and a plurality of screws operating through said threaded apertures and reduced at one end to rotatively engage the sockets of the plate.

In testimony whereof, I affix my signature, in presence of two witnesses.

HORACE D. HOVIS.

Witnesses:
ALEX. POPE,
MAUDE A. WILLIS.